US012649271B2

(12) United States Patent
Gehring et al.

(10) Patent No.: US 12,649,271 B2
(45) Date of Patent: Jun. 9, 2026

(54) MONITORING DEVICE FOR AN INJECTION MOLD

(71) Applicant: Otto Männer GMBH, Bahlingen a.K. (DE)

(72) Inventors: Alexander Gehring, Bötzingen (DE); Siegfried Eppler, Gottmadingen (DE); Christian Slisse, Rixheim (FR)

(73) Assignee: OTTO MÄNNER GMBH, Bahlingen A.K. (DE)

( * ) Notice: Subject to any disclaimer, the term of this patent is extended or adjusted under 35 U.S.C. 154(b) by 220 days.

(21) Appl. No.: 16/756,063

(22) PCT Filed: Oct. 16, 2018

(86) PCT No.: PCT/EP2018/078276
§ 371 (c)(1),
(2) Date: Apr. 14, 2020

(87) PCT Pub. No.: WO2019/076915
PCT Pub. Date: Apr. 25, 2019

(65) Prior Publication Data
US 2020/0290258 A1 Sep. 17, 2020

(30) Foreign Application Priority Data

Oct. 17, 2017 (DE) .......................... 102017124194.9

(51) Int. Cl.
B29C 45/76 (2006.01)
B29C 45/78 (2006.01)
(Continued)

(52) U.S. Cl.
CPC .............. B29C 45/78 (2013.01); B29C 45/84 (2013.01); G05B 19/406 (2013.01);
(Continued)

(58) Field of Classification Search
CPC ......... B29C 45/78; B29C 45/84; B29C 45/76; B29C 45/17; B29C 2945/7604;
(Continued)

(56) References Cited

U.S. PATENT DOCUMENTS 5,571,539 A    11/1996  Starkey
6,434,512 B1 *  8/2002  Discenzo .............. F16C 41/008
                                                          702/184

(Continued)

FOREIGN PATENT DOCUMENTS

CN           1517197 A      8/2004
CN         101268428 A      9/2008
(Continued)

OTHER PUBLICATIONS

English translation of WO 2018/122421 (Year: 2018).*
(Continued)

*Primary Examiner* — Galen H Hauth
*Assistant Examiner* — Baileigh Kate Darnell
(74) *Attorney, Agent, or Firm* — CANTOR COLBURN LLP

(57) ABSTRACT

The present disclosure is directed to a monitoring device for an injection mold. The monitoring device includes a first processing unit and a sensor interface by which during operation at least one sensor is interconnected to the first processing unit. A second processing unit is interconnected to the first processing unit via a data bus to exchange data with the first central processing unit. At least one user interface is interconnected to the second processing unit for exchanging information with a user.

16 Claims, 4 Drawing Sheets

(51) Int. Cl.

| | | |
|---|---|---|
| *B29C 45/84* | (2006.01) | |
| *G05B 19/406* | (2006.01) | |

(52) U.S. Cl.

CPC ................ *B29C 2945/7604* (2013.01); *B29C 2945/76993* (2013.01); *G05B 2219/31455* (2013.01); *G05B 2219/45244* (2013.01)

(58) Field of Classification Search

CPC .. B29C 2945/76993; B29C 2045/1796; G05B 19/406; G05B 2219/31455; G05B 2219/45244; G05B 23/0235; G05B 23/0237; G05B 23/0259; G05B 23/0272; G05B 23/0286

See application file for complete search history.

(56) References Cited

U.S. PATENT DOCUMENTS

| | | | | |
|---|---|---|---|---|
| 6,529,796 | B1 * | 3/2003 | Kroeger | ............... B29C 45/768 |
| | | | | 700/202 |
| 2003/0228386 | A1 * | 12/2003 | Hidaka | .................. B29C 45/84 |
| | | | | 425/162 |
| 2004/0076702 | A1 * | 4/2004 | Werfeli | .................. B29C 45/78 |
| | | | | 264/40.6 |
| 2004/0139810 | A1 | 7/2004 | Saito et al. | |
| 2006/0082009 | A1 * | 4/2006 | Quail | .................. B29C 45/766 |
| | | | | 700/200 |
| 2007/0054004 | A1 | 3/2007 | Manner | |
| 2008/0314781 | A1 | 12/2008 | Eikenberry | |
| 2009/0287342 | A1 | 11/2009 | Hano | |
| 2010/0320632 | A1 * | 12/2010 | Starkey | .................. B29C 45/76 |
| | | | | 425/135 |
| 2011/0316180 | A1 * | 12/2011 | Starkey | .................. B29C 45/76 |
| | | | | 425/135 |
| 2013/0095200 | A1 | 4/2013 | Maruyama | |
| 2014/0046465 | A1 * | 2/2014 | de Oliveira Antunes | ................... |
| | | | | B29C 45/2703 |
| | | | | 700/97 |
| 2015/0014887 | A1 * | 1/2015 | Keitel | .................. B29C 45/281 |
| | | | | 264/328.8 |
| 2016/0236392 | A1 | 8/2016 | Aoyama | |

FOREIGN PATENT DOCUMENTS

| | | | |
|---|---|---|---|
| CN | 101316671 | A | 12/2008 |
| DE | 69332940 | T2 | 6/2003 |
| DE | 102006009947 | A1 | 9/2007 |
| EP | 1927912 | A1 | 6/2008 |
| JP | H06328458 | A | 11/1994 |
| JP | 2013075375 | | 4/2013 |
| KR | 20140050225 | A | 4/2014 |
| KR | 20150029440 | | 3/2015 |
| WO | 0128752 | A1 | 4/2001 |
| WO | 2001028752 | A1 | 4/2001 |
| WO | 2010054128 | A2 | 5/2010 |
| WO | 2010054128 | A3 | 7/2010 |
| WO | 2012159207 | A1 | 11/2012 |
| WO | 14182187 | | 11/2014 |
| WO | 2018122421 | A1 | 7/2018 |

OTHER PUBLICATIONS

Chinese Patent Application No. 2018800674369, First Office Action and Search Report mailed Jul. 27, 2021, including translation.

International Search Report and Written Opinion for PCT/EP2018/078276 mailed Jan. 21, 2019.

"moldMIND", www.maenner-group.com (last visited Nov. 18, 2014).

EP Application No. 18 789 591.7, Communication pursuant to Article 94(3) EPC, mailed Jun. 2, 2021.

"Arduino Info Display" Jan. 11, 2016, retrieved from the internet URL: http://www.nikolaus-lueneburg.de/2016/arduino-info-display/ (15 Pages).

"Adapterchip" https://joy-it-net/de/products/SBC-LCD20x4; retrieved from the internet; Mar. 1, 2024 (4 Pages).

"LCD-Display EAT123A" Arduino NANO: Date: Unknown (5 Pages).

Arduino Nano; Overview; https://store.arduino.cc/products/arduino-nano; retrieved from the internet Feb. 27, 2024 (7 Pages).

Der serielle Datenbus; Seite Bearbeiten; Date unknown (1 Page).

"I2C LCD und Arduino" retrieved from the internet; Mar. 1, 2024, URL: https://www.nikolaus-lueneburg.de/2015/06/i2c-LCD-und-arduino/ (11 Pages).

Kunststoffe "Wissen, was in der Spritzgiebform passiert" Nov. 2004, retrieved from the internet URL: https://www.kunststoffe.de/a/fachartikel/prozessdaten-im-werkzeug-erfassen-wissen-254819.

European Notice of Opposition for European Application No. 18789591.7; Report Mail Date Mar. 22, 2024 (36 Pages).

\* cited by examiner

MONITORING DEVICE FOR AN INJECTION MOLD

CROSS-REFERENCE TO RELATED APPLICATION

This application claims the benefit of the filing date of international PCT Application No. PCT/EP2018/078276, filed on Oct. 16, 2018, that in turn claims priority to German Patent Application No. DE 102017124194.9, filed on Oct. 17, 2017, the contents of which are hereby incorporated by reference in their entirety.

FIELD OF THE INVENTION

The present disclosure relates to a monitoring device for an injection mold.

BACKGROUND

Monitoring devices for injection molds are known from the prior art for many years. U.S. Pat. No. 5,571,539A was first published in August 1996 in the name of Progressive Components Ltd. It is directed to an injection plastic mold with its own on-board monitor or counter, which is actuated with each opening and closing cycle of the mold to maintain a count of the operating cycles performed. This count is maintained with the mold, whether the mold is on the press or a storage rack. The counter or stroke monitor may be either a mechanical counter or an electrical counter which is incorporated into a mold half to remain with the mold when it is stored away from a molding machine, when operated during an initial set-up operation, and when operated during a production run. Whether an on-board mechanical counter or an on-board electrical counter, the counter is hermetically sealed against the intrusion of damaging liquids or chemicals and is mounted in a protective housing to protect against shock, etc. An actuating mechanism is associated with the counter and its actuating mechanism is secured to one of the mold halves so that the actuating mechanism causes the counter to advance and register a count with each molding cycle.

US2007054004 was first published in November 2005 on behalf of Otto Männer Innovation GmbH. It is directed to an injection mold including at least two mold sections which are movable relative to one another for opening and closing the injection mold and an electronic counter with an actuator and a sensor element supplying, influenced by the actuator, a signal indicative of the number of closings of the injection mold, the sensor element is disposed in a first housing and the electronic counter is disposed outside the first housing and connected to the sensor element via an electrical communication line. An injection mold having at least two mold halves of which at least one is movable relative to the other for opening and closing the injection mold, with an electronic data store having a counter, whose counter records the number of injection molding procedures or the number of closing movements of the mold halves and stores said number in recallable manner in the data store. The data store is provided in removable manner on the injection mold and has a sensor for detecting its removed condition and a time-recording element for determining the duration of the removed condition.

US2010320632 was first published in December 2010 on behalf of Progressive Components Int. Corp. It is directed to a monitor for maintaining a mold cycle count with an actuator sending a count signal to a processor following a mold operation. The monitor further includes a timer having an active mode and a sleep mode. The processor generates an average cycle time and an activity percentage of the mold taking into account active and sleep periods of the mold. Further aspects are a method for monitoring a reciprocating tool comprising assigning an electronic monitor to a particular reciprocating tool, positioning the electronic monitor within the reciprocating tool to record a signal following each operation of the reciprocating tool, maintaining a remote record of the operation of the reciprocating tool, maintaining an automated second remote record of the operation of the reciprocating tool, and the second remote record being a non-confidential version of the remote record by having less detail than the remote record.

WO14182187 was first published in November 2014 on behalf of Famolde S A. It is directed to a production optimization and control method and device for a thermoplastics injection molding process. The method applied by the device for optimizing the thermoplastics injection molding process results from the incorporation of specific sensors in the tool, the mold, the injection molding machine and any peripheral device where this might be required. The signals from these sensors are post-processed, making it possible to determine the actual processing conditions during injection molding, and to verify whether the actual processing conditions correspond to predetermined processing conditions. If that is not the case, data are supplied to the injection molding machine and/or peripheral devices in order to optimize processing conditions without any user intervention. The thermoplastics injection molding process is controlled during production on the basis of the results obtained, since these results also allow irregularities in the thermoplastics injection molding process to be detected. The method is similar, and the emphasis on data post processing favors the production management side. The production control man-machine interface is stratified, allowing local or remote operation, production monitoring or device management.

US2013095200 was first published in April 2013 in the name of Fanuc Ltd. It is directed for detection of abnormality in an injection molding machine. A reference physical quantity and a current physical quantity are successively compared with each other in association with an elapsed time during which a moving part operates or an operating position of the moving part, and a deviation of the physical quantity is determined. An average of absolute values of the determined deviations of the physical quantities is calculated, and a threshold corresponding to the elapsed time during which the moving part operates or the operating position of the moving part is calculated such that the threshold increases as the calculated absolute value increases. Abnormality is detected if the calculated threshold is exceeded by the determined deviation of the physical quantity.

JP2013075375 was first published in April 2013 in the name of Fanuc Ltd. The aim is to provide a failure detection device for an injection molding machine which is free from needlessly stopping the molding operation when the load of a movable part is varied due to some causes and capable of precisely detecting the failure when the failure occurs. When the deviation between a reference load and the present load exceeds a threshold value in a failure detection section by storing the load applied to a servo motor for mold clamping correspondingly to the elapsed time from the mold closing start as the reference load and setting a part (a first part) of the mold closing section as the failure detection section, further a part (a second part) in the clamping section is set as a load change detection section. The threshold value for the failure determination is corrected based on the change of the load detected in the load change detection section and the failure is detected when the deviation of the present load and the reference load exceeds the threshold value after correction.

KR20150029440A was first published in March 2015 on behalf of Kim Chel Min. It is directed to an injection device integral monitoring system. The injection device integral monitoring system monitors the inside temperature, pressure, humidity, hopper remaining amount, length, and weight of the injection device by including a plurality of sensing units installed in each monitoring zone in the injection device to detect 6-factor values such as temperature, pressure, humidity, hopper remaining amount, length, and weight. An integral indicator connected with the sensing unit and monitoring the state in each monitoring zone of the injection device and a monitoring unit for controlling the integral indicator through a wired/wireless communication technique. The injection device integral monitoring comprises a plurality of sensing units installed in multiple monitoring zones divided in the injection device and detecting the inside temperature, pressure, or humidity values of the injection device; an integral indicator connected with the sensing units, provided with the 6-factor values of the injection device, and monitoring the injection device by comparing the provided 6-factor current values to predetermined 6-factor upper/lower bonding values in real time and a monitoring unit connected with the integral indicator through a wired/wireless communication technique, provided with the 6-factor values, and controlling the integral indicator based on the provided values.

Nowadays large and complicated molds are often operated at very high capacity and in a very dense time frame. Maintenance intervals shall be kept short to avoid loss of time. The monitoring devices known from the prior art have several disadvantages, namely when used on a long term basis. Furthermore, the monitoring devices as presently known need a significant amount of energy and can guarantee proper functionality only when connected to an external power supply.

SUMMARY

A monitoring device according to the present disclosure has superior functionality when compared to the monitoring devices as known from the prior art. Beside higher robustness during operation it offers long term, continuous and standalone operability of certain key functions as described hereinafter. The monitoring device normally comprises a first processing unit and a sensor interface by which during operation at least one sensor is interconnected to the first processing unit. If appropriate several sensors of the same and/or different kind are interconnected to each other in a serial and/or parallel manner. The sensor interface can be foreseen to interconnect to at least one sensor out of the group of the following sensors: Temperature sensor, pressure sensor, cycle counting sensor, acceleration sensor, acoustic sensor, optical sensor, vibration sensor, flow rate sensor. Depending on the field of application, other sensors, or a combination thereof, can be connected. If necessary the programming of the first processing unit is adapted correspondingly. The at least one sensor, interconnected at least during operation to the first processing unit, is preferably integrated in the mold and/or the monitoring device (e.g. acoustic sensor and/or acceleration sensor and/or pressure sensor and/or location sensor). The monitoring device furthermore comprises a second processing unit, interconnected to the first processing unit via an (internal) data bus or similar means, to exchange data with the first central processing unit. The exchange of data preferably takes place in both directions.

Depending on the field of application, the first and the second processing unit are implemented as micro controllers and can be arranged on the same PCB (Printed Circuit Board) or in a remote manner in the same housing or different housings, respectively PCBs. A processing unit normally comprises a micro controller that carries out the instructions according to a program made available to it. The processing units of the monitoring device are interconnected directly or indirectly to each other and to other devices (same or different) such as data storage unit, power supply, input device, sensors, etc. If appropriate the first and the second processing unit of the monitoring device can even be arranged on the same die, e.g. of a specially designed micro controller, which results in a more space saving design. It even is possible to arrange the first processing unit and the thereto related elements at and/or inside a mold, such that at least the first processing unit is not detachable from the mold.

In one variation, the first processing unit is primarily foreseen to measure the physical dimensions of the thereto interconnected sensors over a certain period of time (e.g. up to ten years). In addition the first processing unit stores the measured values of the physical dimensions in a data storage unit (memory) interconnected to the first processing unit. If appropriate, the first processing unit can be used to process the measured values at least partially. Depending on the implementation of the monitoring device, at least some of the interconnected sensors can be addressed simultaneously. Alternatively or in addition the sensors can be addressed sequentially in a periodic and/or aperiodic manner. The first processing unit normally operates at a lower clock rate than the second processing unit. For safety reasons, the first processing unit is preferably encapsulated from the outside under normal operating conditions, such that it is not directly accessible by a user. Certain modes of operation can be foreseen, wherein direct access is possible. The second processing unit is primarily foreseen to interact with the outside and to communicate with the first processing unit. The second processing unit therefore has direct or indirect access to the measured values stored in the data storage unit interconnected to the first processing unit. When information is needed a request is provided to the second processing unit by a requester, e.g. via a user interface and/or a network connection, etc. The second processing unit then retrieves the requested information from the data storage unit based on the measured values stored therein. Depending on the request, the retrieved information is processed by the second processing unit before it is made available to the requester.

A mold suitable to be connected to a monitoring device normally comprises a first and a second mold half which during operation interact with each other forming at least one cavity suitable to receive liquefied plastic material through an injection nozzle arranged in the first mold half (nozzle side). During production the mold is opened by relative movement of the second mold half with respect to the first mold half in a first direction, after the injected material has cured sufficiently. In the meantime, the produced items remain at the second mold half, which comprises an ejector mechanism to eject the parts from the second mold half (ejector side). While the first mold half normally remains stationary fixed to a stationary mold clamping plate of an injection molding press, the second mold half is attached to a moveable mold clamping plate of the injection molding press. The monitoring device is preferably attached to the first mold half.

For power saving reasons, the first processing unit can be operated at a lower clock rate than the second processing unit, which is more responsible for the outside communication of the monitoring device. During normal operation of the mold, when the monitoring device is active, the first processing unit is in operational contact with the at least one sensor (internal and/or external) while the second processing unit, during times when no outside communication is necessary, can be switched off completely, put in a hibernation mode or the clock frequency is reduced significantly. In one variation, the second processing unit is operated by a Linux-based operating system suitable to receive programming code executed by the operating system.

Good results can be achieved when the primary operation and control of the first processing unit, which is typically responsible for the monitoring of the thereto interconnected mold, is done through communication with the second processing unit. If appropriate, the second processing unit can be equipped with a web-server. The special design provided herein offers the advantage that the web-server can be completely separated from the monitoring functionality. Thereby a very robust and highly secure behavior can be achieved.

The herein disclosed monitoring device can offer the following advantages/functions in various example implementations: Display number of cycles, number of cycles per day, shortest cycle time and time stamp, run/stop time, dismantling time, interval counter (for service actions), production counter (e.g. daily output), cycle time according to the complete mold run time, cycle time calculated after a certain number of cycles (e.g. 25'000), percentage of run time vs. down time, separate cycle counter resettable, measured values of at least one temperature sensor, safety function for valve pin movement, display battery low when certain threshold is achieved.

To communicate with the outside, namely a user, the monitoring device comprises at least one user interface. In one variation the at least one user interface is interconnected directly or indirectly to the second processing unit. Alternatively or in addition, the user interface can be interconnected to the first processing unit. However, for reduced power consumption, the monitoring device is preferably interconnected to the second processing unit. The user interface normally comprises at least one indicator and/or a display and/or device for generating an acoustic signal. Furthermore, the monitoring device comprises at least one input device including a button, keyboard, or touchscreen. The at least one input device can be integrated into the housing of the monitoring device or arranged in a remote manner. If appropriate, the monitoring device can comprise a non-volatile data storage unit on which information (e.g. manual, test protocols, specifications, construction drawings) regarding the related mold can be stored. In a variation, the first processing unit is interconnected to a first power supply and the second processing unit is interconnected to a second power supply, wherein the first power supply comprises a first battery. If appropriate an additional second battery may be foreseen to maintain power for certain functions, which are related to the second processing unit. A simple, yet robust, design can be achieved when the second battery is charged by the second power supply. By the design as described it becomes possible to guarantee power for at least certain monitoring functions for several years independent from an outside power supply. In a variation, the first processing unit is, during a certain period of time, energized by the first battery only, while the second processing unit is energized by the second power supply.

As mentioned above, for recording data received from the central processing unit, a data storage unit can be interconnected to the first processing unit. The data storage unit can e.g. comprise a memory of the type EEPROM (electrically erasable programmable read-only memory) and/or an FRAM (Ferroelectric Random Access Memory) or the like. If appropriate, the monitoring device may comprise at least one network interface unit for exchanging data with other devices via a network connection. The network interface unit can be wireless (e.g. Wi-Fi, Bluetooth, GSM, etc.) or wire based. Furthermore, the monitoring device may comprise a GPS-module and/or a GSM-module which is interconnected to the first processing unit. This allows determination of the position of the monitoring device, respectively to the thereto related mold. Furthermore, the possibility exists to communicate with the monitoring device even though the user interface is not active.

Depending on the field of application, the sensor interface can be foreseen to interconnect to at least one sensor, including, but not limited to a temperature sensor, pressure sensor, cycle counting sensor, acceleration sensor, acoustic sensor, optical sensor, vibration sensor, or flow rate sensor. If appropriate, the monitoring device may comprise an interface to interconnect the monitoring device to a control unit of mold press.

In one variation, the monitoring device comprises a first housing and a second housing, which is mechanically interconnectable to the first housing via at least one connector assembly. Depending on the field of application, the first housing may comprise the first and the second processing unit. Alternatively or in addition, the first housing may comprise the first processing unit and the second housing may comprise the second processing unit. In the variation, where both processing units are arranged in the first housing, the second housing acts more as an adapter to the interconnected first housing and the therein enclosed components to the mold to be monitored. The sensors are then normally interconnected to the second housing and via the connector assembly to the processing units, which are arranged in the first housing. The second housing may comprise at least one fastening means to fasten the second housing directly or indirectly to a mold. The connector assembly may comprise a linking sensor which indicates whether the first and the second housing are interconnected to each other or not. The linking sensor is may be interconnected to the first processing unit taking influence on its state of operation. In the case of a first and a second housing, the connector assembly preferably comprises a sensor interface for at least one temperature sensor and/or a cycle counter and/or a pressure sensor. Good results can be achieved when the linking sensor is a hall sensor.

An injection mold in an injection molding system comprising a hot runner nozzle with a needle valve gate can be damaged during heating-up of the mold, when the needle of the needle valve is actuated before the operation temperature is reached, i.e. the plastic material surrounding the needle is sufficiently liquefied. To avoid such damage due to premature start of the production process, the monitoring device can be implemented as a safety device or interconnected with such a standalone system. In a preferred variation, the safety device comprises a temperature sensor which is arranged sufficiently close to the needle, respectively the needle gate (nozzle tip) of the needle valve to measure a temperature which corresponds to or is related to the temperature of the plastic material surrounding the needle in the area of the needle gate. Depending on the field of application, the temperature sensor can be interconnected to a processing unit of the monitoring device according to the present disclosure. Alternatively or in addition, the temperature sensor can be interconnected to another processing unit not forming part of the monitoring device. An existing and/or an additional valve or switch, which is interconnected to the actuator of the needle of the needle valve, is interconnected to the processing unit to which the temperature sensor is interconnected directly or indirectly. The valve or the switch is normally closed when a preset condition (temperature) is not achieved. In this condition the actuator cannot be actuated. As soon as the preset condition is reached, i.e. the material in the nozzle is sufficiently liquefied, the valve or switch are opened such that the injection molding process can be started. The same normally applies for the situation when no power supply is connected to the safety device. Thereby it can be prevented that the safety device can be overruled. A very high safety level can be achieved when the safety device is implemented as a separate (standalone) device not depending on other devices, e.g. beside power supply, of the molding system (mold, mold press, etc.). In a variation, the monitoring device is interconnected to a control system of the injection molding machine on which the mold monitored by the monitoring device is installed. In the critical situation as described above, the monitoring device sends a signal to the control system of the injection molding machine to prevent activation of the actuator of the needle. A standalone variation of the safety device is described in more detail in the drawings. The safety device described herein above should be considered another advantage of the present disclosure.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The present disclosure will be more fully understood from the detailed description given herein below and the accompanying drawings which should not be considered limiting to the disclosure described in the appended claims. The drawings show:

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
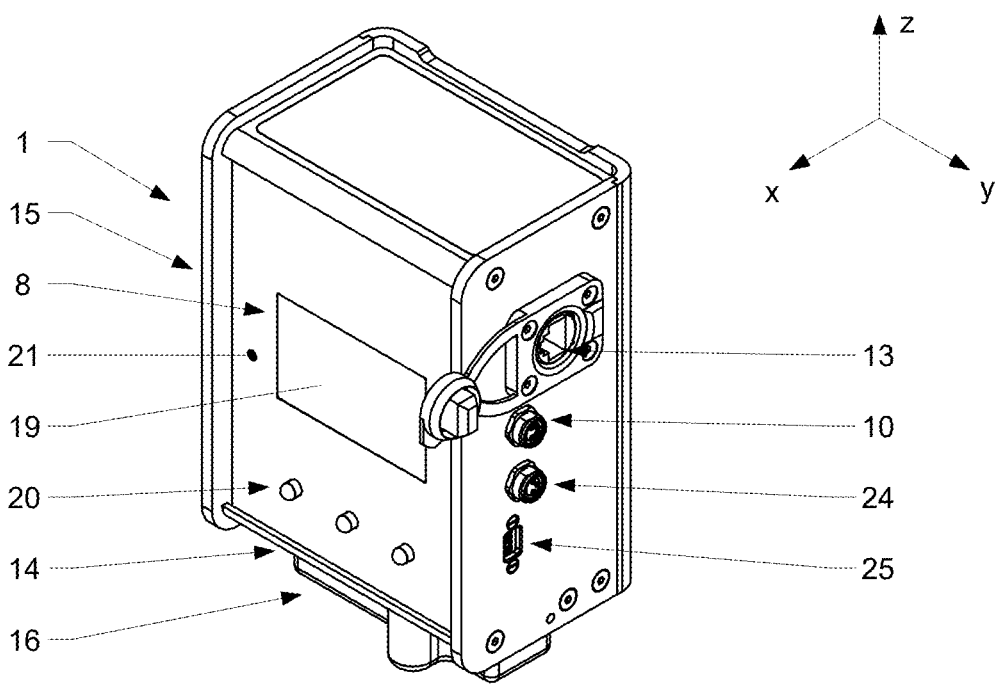
FIG. 1 a monitoring device in a perspective view from the front and above wherein a first and a second housing are interconnected to each other.
Figure 2:
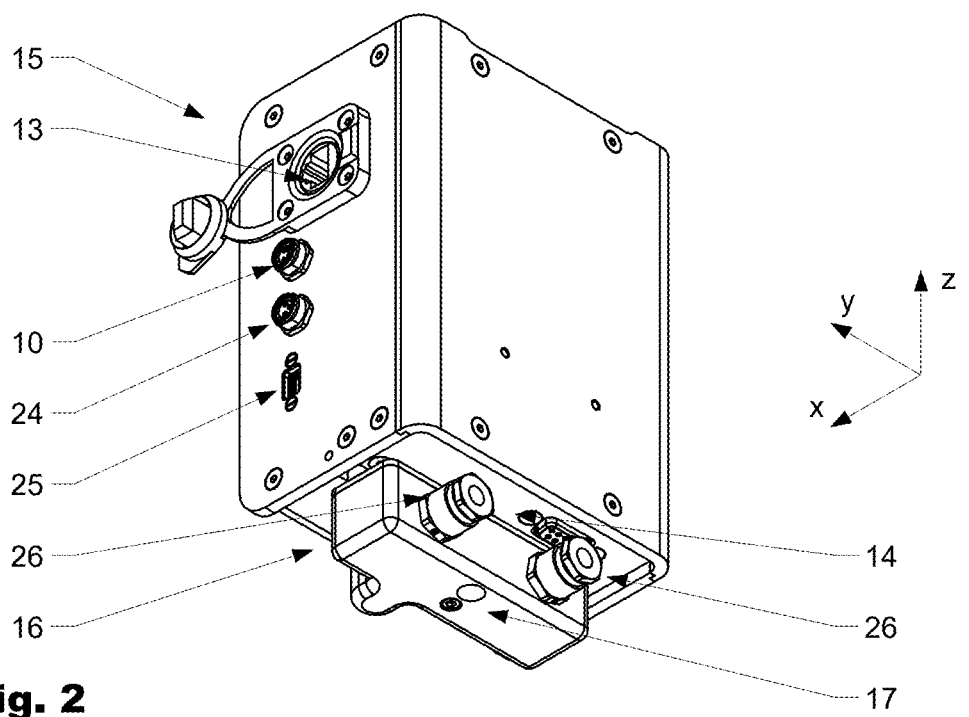
FIG. 2 the monitoring device according to FIG. 1 in a perspective view from behind and below.

FIG. 1 shows a monitoring device 1 according to the present disclosure in a perspective view from the front and above. FIG. 2 shows the monitoring device 1 in a perspective view from below and behind. The monitoring device 1 comprises a first housing 15 and a second housing 16 which are interconnected to each other by a connector assembly 14 which in the here shown interconnected position is arranged between the first and the second housing 15, 16.

Figure 3:
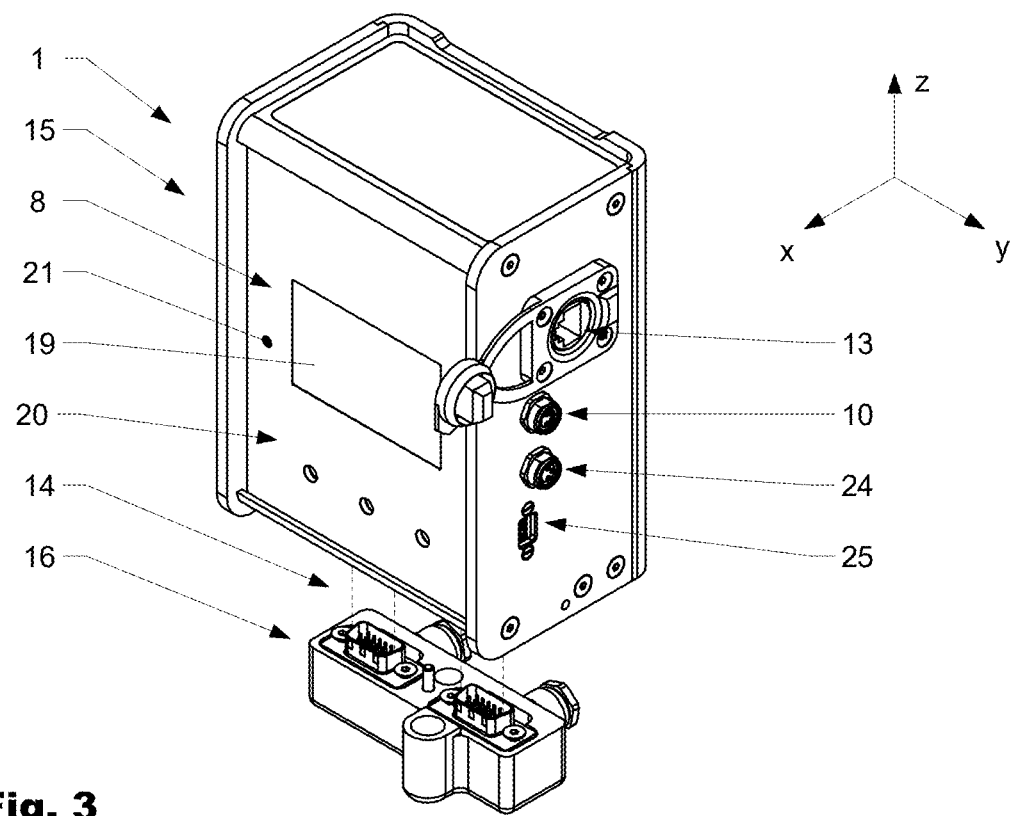
FIG. 3 a monitoring device in a perspective view from the front and above wherein a first and a second housing are separated from each other.
Figure 4:
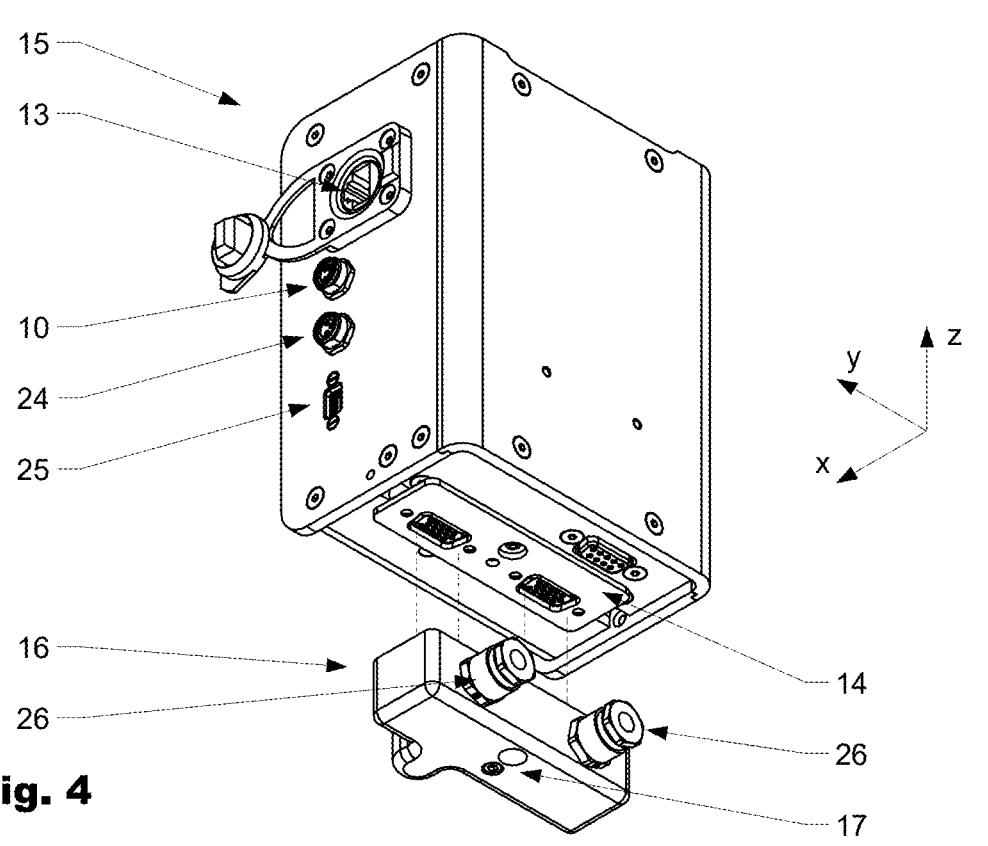
FIG. 4 the monitoring device according to FIG. 3 in a perspective view from behind and below.
Figure 5:
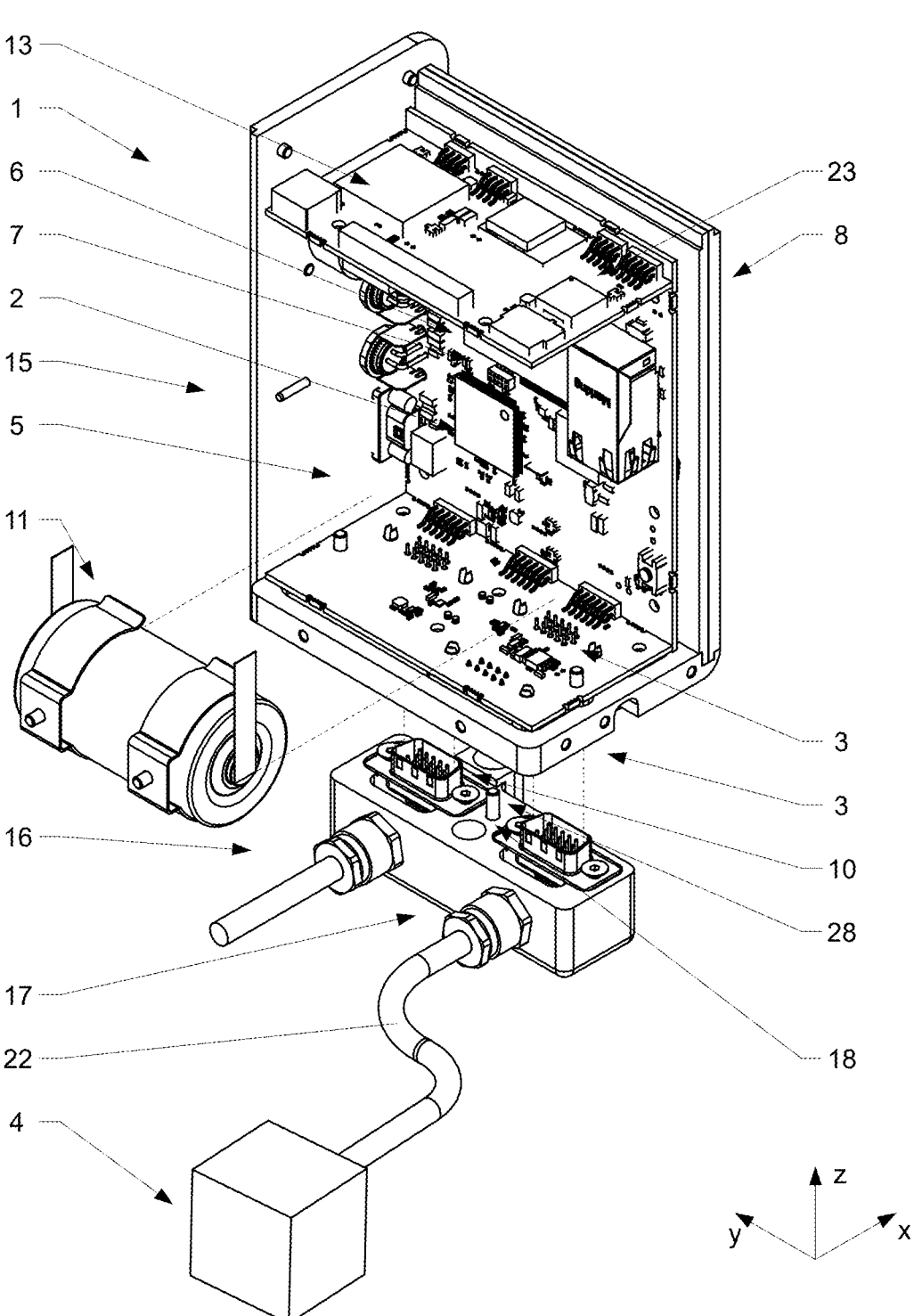
FIG. 5 a perspective, exploded view of the inside of a monitoring device.

FIG. 3 and FIG. 4 are showing the first and the second housing 15, 16 spaced apart from each other in a vertical direction (z-direction). The connector assembly 14 is shown in a disengaged manner. Interconnection is indicated by dotted lines. The monitoring device is foreseen to be interconnected to a mold which is not shown in detail. As visible in FIG. 5, which is showing an inside view of the monitoring device 1, the monitoring device 1 comprises a first processing unit 2 arranged on a PCB (printed circuit board) 23. The first processing unit 2 which is interconnected to a sensor interface 3 by which at least during operation at least one sensor 4 is interconnected to the first processing unit 2 by a cable 22. A second processing unit 6, interconnected to the first processing unit 2 via a data bus 7, to exchange data with the first central processing unit 2. At least one user interface 8, here in the form of a display 19, is interconnected to the second processing unit 6 for exchanging information with a user. Alternatively or in addition, the user interface 8 can comprise other elements alone or in combination, such as: At least one LED 20 indicating the status of the device, respectively specific parameters. At least one button 21, e.g. for resetting the device or a part thereof.

In the shown variation, the first processing unit 2 is interconnected to a first power supply and the second processing unit 6 is interconnected to an external second power supply 10, wherein the first power supply comprises a first battery 11. When not connected to an external power supply the monitoring device 1 is supplied with electrical power at least by the first battery, which is preferably arranged inside the first housing 15. The first battery 11 is preferably dimensioned, such that the monitoring device can be operated in a standalone manner over a certain period of time, e.g. up to 10 years. When not connected to the second power supply, the second processing unit is not activated, i.e. is switched-off completely or is set into a sleep mode.

A data storage unit 5 is interconnected to the first processing unit 2 for recording data received from the first processing unit 2.

The monitoring device 1 comprises one or several network interface units 13 (Wi-Fi, Bluetooth, LAN, GSM) for exchanging data with the outside via a network connection. The at least one network interface 13 is preferably interconnected to the second processing unit 6. However, it can be interconnected, at least under certain operating conditions, to the first processing unit 2. Depending on the field of application, the monitoring device 1 comprises a GPS-module 23, which is normally interconnected to the first processing unit 2 to determine the position of the mold interconnected to the monitoring device 1 during time. The monitoring device 1 may be interconnected to at least one sensor, including, but not limited to, a temperature sensor, pressure sensor, cycle counting sensor, acceleration sensor, acoustic sensor, optical sensor, vibration sensor, or flow rate sensor. If appropriate, several sensors can be interconnected to a combined sensor. The monitoring device 1 may comprise at least one external interface 24 e.g. to interconnect the monitoring device 1 to a control unit of the mold press (both not shown in detail). If appropriate, the monitoring device 1 comprises a USB-Interface 25 to exchange data with the monitoring device 1.

As visible in the drawings, the shown variation of the monitoring device 1 comprises a first housing 15 and a second housing 16, which are mechanically interconnectable to each other via a connector assembly 14. Depending on the field of application, different configurations are possible. The connector assembly comprises at least one electrical connector. Furthermore, a locking means is present to lock the first with respect to the second housing 15, 16. Alternatively or in addition, the data transmission can be done by at least one optical connector (not shown in detail).

In a variation, the second housing 6 is designed as a base for the first housing 2. The second housing is attached to the mold (not shown in detail), for example, on the nozzle side as mentioned above, and interconnected via at least one electrical cable 22 of a sensor 4. In this situation, the first housing 15, which is interconnected to the second housing 6 in a detachable manner via the connector assembly 14, may comprise the second processing unit 6 (and the thereto related elements necessary for operation, e.g. power supply etc.) and the second housing 16 comprises the first processing unit 2 (and the thereto related elements necessary for operation). Thereby it can be guaranteed that the monitoring device 1 remains operable even when the first housing 2 is separated from the second housing. To attach the second housing 16 to a mold, the second housing comprises at least one fastening means 17 to fasten the second housing 16 directly or indirectly to a mold. Alternatively or in addition, a mounting adapter can be foreseen.

The connector assembly 14 may further comprise a linking sensor 18 which indicates whether the first and the second housing 15, 16 are interconnected to each other or not. The connector assembly 14 comprises a sensor interface for at least one temperature sensor and/or a cycle counter and/or a pressure sensor.

Figure 6:
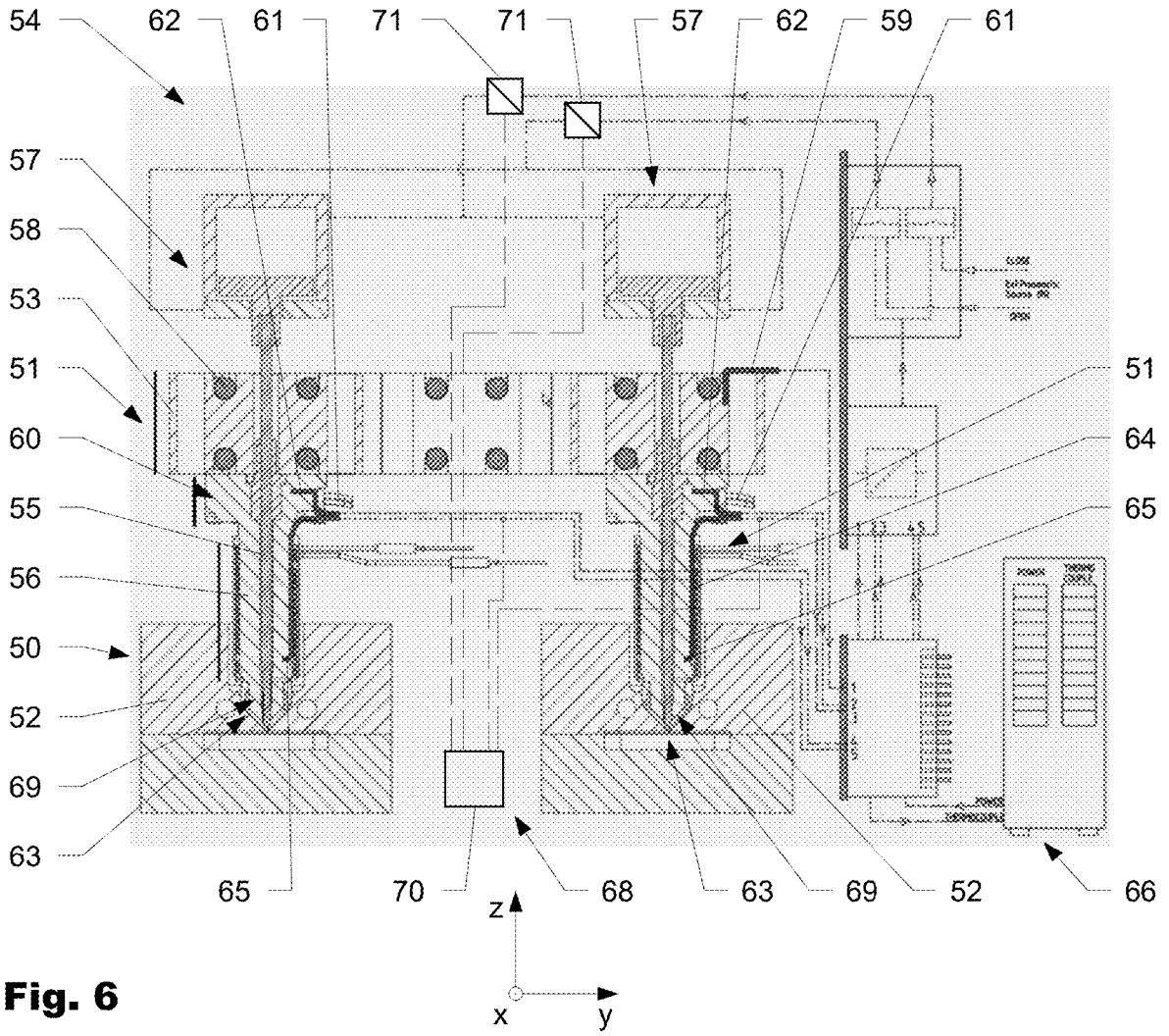
FIG. 6 a safety device.

FIG. 6 is showing in a schematic manner a hot runner apparatus 54 in a section view as typically used in an injection mold 50. A safety device 68 as already described hereinabove will now be addressed in more detail based on a sample arrangement as described hereinafter. In the shown variation, two hot runner nozzles 51 are visible each interconnected to a cavity block 52. The hot runner apparatus 54 comprises a hot runner manifold 53. Each nozzle 51 comprises a needle 55 which is guided inside of a nozzle body 56. A rear end of the needle 55 is interconnected to an actuator, here in the form of a pneumatic cylinder 57, for linear displacement of the needle in axial direction (z-direction). The nozzle 51 is separated in three thermal zones, which can be summarized as follows: A first zone includes the hot runner manifold 53 which can be heated via a heating element 58. The temperature is measured via a first temperature sensor 59. A second zone comprises at least one rear end 60 of a nozzle body 56, which can be heated via a thermally connected heating element 61. The temperature in the second zone is measured via a second temperature sensor 62. A third zone covers a tip 63 of a nozzle body 56, which is heating via heating element 64. The respective temperature of the tip 63 is measured by a third temperature sensor 65. The heating elements 58, 61, 64 are interconnected to a heating element control panel. To avoid damage of the hot runner apparatus 54, namely the hot runner nozzles 51, due to premature start of the production process, the safety device 68 is implemented as follows. The safety device 68 comprises a separate temperature sensor or is interconnected to an existing temperature sensor 65 which is arranged sufficiently close to the needle 55, respectively the nozzle tip 63 of the needle valve to measure a temperature which corresponds to or is related to the temperature of the plastic material surrounding the needle in the area of a needle valve 69.

The third temperature sensor 65 is interconnected to a supplementary processing unit 70 which is here not forming part of the normal arrangement found in the injection molding device. In the shown variation, for each nozzle 51 (respectively per direction of movement) at least one additional valve 71 is foreseen arranged in the course of the pneumatic for actuating the actuators 57. The additional valves 71 are normally closed when a preset condition (temperature) is not achieved. In this condition, the actuator cannot be actuated although the control unit or the injection molding machine sends a command to actuate the actuators 57. The same normally applies for the situation when no power supply is connected to the safety device 68. Thereby it can be prevented that the safety device can be overruled. The valves 71 are interconnected to the actuator 57 of the needle 55 of the hot runner nozzle 51 to prevent harmful movement of the actuator 57 by the processing unit 70 before the temperature measured by the temperature sensor 65 is below a preset temperature. The herein shown variation of the safety device is implemented as a separate (stand-alone) device not depending on other devices, beside power supply, of the molding system (mold, mold press, etc.)

The invention claimed is:

1. A monitoring device for attachment to a first mold half of an injection mold, the monitoring device comprising:
   a. first processing unit configured to monitor the injection mold interconnected thereto;
   b. several sensors interconnected to the first processing unit during operation, the several sensors being similar or different kinds and are interconnected in a serial and/or parallel manner, at least one sensor of the several sensors being a temperature and/or pressure sensor integrated into the injection mold;
   c. a second processing unit, interconnected to the first processing unit via a data bus and configured to exchange data with the first processing unit;
   d. at least one user interface interconnected to the second processing unit configured to exchange information with a user; and
   e. a first housing and a second housing, which is mechanically interconnectable to the first housing via at least one connector assembly;
   f. wherein the first housing comprises the first processing unit and the second housing comprises the second processing unit; and
   h. an external interface to connect the monitoring device to a control unit of a mold press.

2. The monitoring device according to claim 1, wherein a data storage unit is interconnected to the first processing unit configured to record data received from the first processing unit.

3. The monitoring device according to claim 1, wherein a network interface unit configured to exchange data via a network connection is interconnected to the second processing unit.

4. The monitoring device according to claim 1, wherein the monitoring device comprises at least one of a GPS-module or a GSM-Module which is interconnected to the first processing unit.

5. The monitoring device according to claim 1, wherein the several sensors include at least one of a temperature sensor, a pressure sensor, a cycle counting sensor, an acceleration sensor, an acoustic sensor, an optical sensor, a vibration sensor, or a flow rate sensor.

6. The monitoring device according to claim 1, wherein the connector assembly comprises a linking sensor which indicates whether the first housing and the second housing are interconnected to each other.

7. The monitoring device according to claim 1, wherein the connector assembly comprises an interface for at least one of a temperature sensor, a cycle counter, and a pressure sensor.

8. The monitoring device according to claim 1, wherein the at least one sensor is interconnected directly to the first processing unit.

9. The monitoring device according to claim 1, wherein a temperature sensor and a valve are interconnected to the monitoring device, wherein the valve is interconnected to an actuator of a needle of a needle valve arranged in the injection mold to be monitored.

10. A safety device interconnected to a monitoring device according to claim 1, wherein the safety device comprises a processing unit interconnected to a temperature sensor arranged in an area of a nozzle tip of a hot runner nozzle and at least one valve or switch interconnected to an actuator of a needle of the hot runner nozzle configured to prevent harmful movement of the actuator by the processing unit as long as the temperature measured by the temperature sensor is below a preset temperature.

11. A mold comprising the monitoring device according to claim 1.

12. A method for monitoring of an injection mold using the monitoring device according to claim 1, wherein at least one sensor arranged at the injection mold to measure at least one physical value of the injection mold is interconnected to the first processing unit of the monitoring device, the method comprising the following method steps:

a. Controlling an operation of the first processing unit via a program code executed on the second processing unit through the data bus.

13. A monitoring device for an injection mold comprising:

a. a first processing unit configured to monitor the injection mold interconnected thereto;

b. several sensors interconnected to the first processing unit during operation, the several sensors being similar or different kinds and are interconnected in a serial and/or parallel manner, wherein at least one sensor of the several sensors is a temperature and/or a pressure sensor integrated in the injection mold;

c. a second processing unit, interconnected to the first processing unit via a data bus, to exchange data with the first processing unit;

d. at least one user interface interconnected to the second processing unit for exchanging information with a user;

e. a first housing, wherein the first processing unit and the second processing unit are arranged on a same printed circuit board or different printed circuit boards in the first housing, f. wherein the first processing unit is interconnected to a first power supply and the second processing unit is interconnected to a second power supply, wherein the first power supply comprises a first battery thereby guaranteeing power supply to the first processing unit for at least certain monitoring functions for several years independent from an outside power supply;

g. wherein, for power saving reasons the first processing unit is operated at a lower clock rate than the second processing unit; and h. an external interface to interconnect the monitoring device to a control unit of a mold press.

14. The monitoring device according to claim 13, wherein the first processing unit is, during a certain period of time, energized by the first battery only, while the second processing unit is energized by the second power supply.

15. The monitoring device according to claim 13, wherein the second power supply comprises an additional second battery configured to maintain power for certain functions, which are related to the second processing unit, wherein the second battery is configured to be charged by the second power supply.

16. A monitoring device for an injection mold comprising:

a. a first processing unit configured to monitor the injection mold interconnected thereto;

b. several sensors interconnected to the first processing unit during operation, the several sensors being similar or different kinds and are interconnected in a serial and/or parallel manner, wherein at least one sensor being a temperature and/or a pressure sensor integrated in the injection mold;

c. a second processing unit, interconnected to the first processing unit via a data bus, to exchange data with the first processing unit;

d. at least one user interface interconnected to the second processing unit for exchanging information with a user; and e. a first housing, wherein the first processing unit and the second processing unit are arranged on a same printed circuit board or different printed circuit boards in the first housing;

f. wherein the first processing unit is interconnected to a first power supply and the second processing unit is interconnected to a second power supply, wherein the first power supply comprises a first battery thereby guaranteeing power supply to the first processing unit for at least certain monitoring functions for several years independent from an outside power supply;

g. wherein, when not connected to the second power supply, the second processing unit is not activated; and h. an external interface to interconnect the monitoring device to a control unit of a mold press.

\* \* \* \* \*